Patented Nov. 17, 1925.

1,562,146

UNITED STATES PATENT OFFICE.

ADRIEN CAMBRON, OF TOTTENVILE, NEW YORK, ASSIGNOR TO THE ROESSLER & HASSLACHER CHEMICAL COMPANY, OF NEW YORK, N. Y., A CORPORATION OF NEW YORK.

ACCELERATOR FOR THE VULCANIZATION OF RUBBER.

No Drawing.   Application filed June 27, 1925.   Serial No. 40,106.

*To all whom it may concern:*

Be it known that I, ADRIEN CAMBRON, a subject of the King of England, and resident of Tottenville, in the county of Richmond and State of New York, have invented certain new and useful Improvements in Accelerators for the Vulcanization of Rubber, of which the following is a specification.

It is the object of this invention to provide a substance for aiding the vulcanization of rubber which will be cheap while at the same time powerful, rapid, nonpoisonous, hard but of low softening or melting point and of a brittle nature so as to allow of easy pulverization, and distribution in a rubber mix.

My invention relates to the improvement of the products formed by the condensation of aldehydes with amines and more specifically to the improvement of that product formed by the condensation of acetaldehyde with aniline.

The use of the ordinary condensation products of acetaldehyde and aniline have been known for some time in the art of vulcanizing rubber. These substances vary greatly in nature due to the varying methods of formation and to the many different ratios suggested and employed in the mixing of the aldehyde and aniline. Most of these substances however are of an undesirable soft pitchy nature being neither hard nor liquid. Because of this soft and sticky nature the handling of the material is beset with many inconveniences. Recently there has come into the art a process whereby these soft aldehyde resins are rendered more or less hard by the further addition of aldehydes, such as acetaldehyde or formaldehyde, after the primary condensation has taken place. This has been done on the basis that the new aldehydes added combine with the soft primary condensation product to form a new substance which is hard.

I have discovered however that the softness of ethylidene aniline, this being the common trade name for the condensation product of acetaldehyde and aniline, is due not to the nature of the condensation product ethylidene aniline itself but is due to the presence of unreacted alinine. It is true that ordinarily excess aldehyde is used in the manufacture of the so called ethylidene aniline nevertheless the reaction appears to be incomplete and in the heating subsequent to the mixing of the materials the excess aldehyde is lost, but the free alinine remains.

I have found that the recent methods of further aldehyde addition are a needless waste. I have discovered that the unreacted aniline can easily be sufficiently removed from the soft mixture by steam blowing so that the resulting residue solidifies to a desirable material. By steam blowing as used throughout the specification and claims I mean the passing of steam through the heated mass of material to be treated, thus carrying off with the steam such of the components as are volatile with steam. In the case cited above aniline though having a high boiling point when heated alone, is volatile with steam and passes out of the mixture with it. This process of steam blowing is thus definitely distinguished from the process of mere heating of the mixture by the external application of steam. The aniline thus removed is easily recovered by separation of the condensate. I am thus able to remove 10% to 15% by weight of the soft product as free aniline and obtain a product substantially aniline free and hard. By the term "hard product" as used herein I mean a product which will easily shatter at 20° C. if struck a sharp blow and can be pulverized and will remain in this state at a temperature of 20° C. for several days without agglomerating to a single lump. The resulting product is a most satisfactory accelerator of the vulcanization of rubber giving higher tensiles from parallel tests than does the excess aldehyde treated material as is shown by the following.

*Formula.*

100 parts by weight smoked sheet.
5 parts by weight zinc oxide.
5 parts by weight sulphur.
1 part by weight accelerator.
Cured with 40 lbs. steam for 40 minutes.
Excess acetaldehyde product, break, 2889 lbs/in$^2$.
Steam blown product, break, 3400 lbs/in$^2$.

Accordingly my invention comprises a process of treating rubber or similar material which comprises combining the rubber with a vulcanizing ingredient and the steam blown reaction product of acetaldehyde and aniline and vulcanizing the rubber. My invention also includes the product of such process.

The steam blown reaction product of acetaldehyde and aniline is preferably prepared as illustrated by the following data taken from a plant batch.

320 pounds aniline are placed in a water jacketed kettle with a closed top and 200 pounds acetaldehyde run in slowly with thorough agitation. The mixture warms up during the acetaldehyde addition and pressure develops in the kettle. The pressure is allowed to rise to about 12 pounds per square inch and then held at about this point during the addition of the remainder of the acetaldehyde. The molecular ratio of the aldehyde to the aniline is here about 1.3 to 1. The mix is now agitated till the pressure begins to drop indicating that the reaction is slowing down. The mixture is now heated 2½ to 3 hours by steam at 25 lbs. pressure in the kettle jacket, this completes the reaction as far as is economical in view of the cost of steam and time. The kettle is now opened to a condenser and steam at 100 pounds is allowed to flow into the bottom of the mixture in the kettle thus subjecting the mix to the steam blowing process. When a test portion of the batch shows that the desired consistency has been reached the steam is shut off and the batch blown out into trays for cooling and hardening.

It is evident that the same results can be obtained by variations in the above method and proportions of acetaldehyde and aniline and I do not desire to be limited to the exact ratios as shown by the above figures nor to the temperatures and pressures given. Neither do I desire to be limited to the exact proportions given in the embodiment of my invention.

I have further found that subjecting the aldehyde-amine condensation product to steam blowing also produces a material of better accelerating value than the original. This is shown by the following data as obtained from acceleration tests in the following formula:

|  | Parts. |
|---|---|
| Smoked sheet | 100 |
| Zinc oxide | 5 |
| Sulphur | 5 |
| Accelerator | 1 |

All cures with 40 lbs. steam for 30 minutes.

1. Soft acetaldehyde-aniline condensation product (3:2).

| Stretch. | Set. | Load at 700% elong. | Tensile. |
|---|---|---|---|
| 851 | 15 | 938 lbs/in² | 3108 lbs/in². |

2. Steam blown product from 1.

| Stretch. | Set. | Load at 700% elong. | Tensile. |
|---|---|---|---|
| 851 | 15 | 1272 lbs/in² | 3361 lbs/in². |

3. Material of 2 with original aniline returned.

| Stretch. | Set. | Load at 700% elong. | Tensile. |
|---|---|---|---|
| 810 | 15 | 1309 lbs/in² | 3035 lbs/in². |

4. Material of 2 with fresh aniline added equal to amount removed.

| Stretch. | Set. | Load at 700% elong. | Tensile. |
|---|---|---|---|
| 801 | 15 | 1232 lbs/in² | 3091 lbs/in². |

I have also prepared the condensation product of acetaldehyde and ortho-toluidine and tested it in the above formula then subjected it to steam blowing and tested this product in the same formula. The steam blown product was again superior as shown by the following.

1. Ethylidene ortho-toluidine (untreated).

| Stretch. | Set. | Load at 700% elong. | Tensile. |
|---|---|---|---|
| 820 | 15 | 2000 | 3233. |

2. Product from steam blowing of 1.

| Stretch. | Set. | Load at 700% elong. | Tensile. |
|---|---|---|---|
| 792 | 15 | 2450 | 3575. |

The improved condensation product of aldehydes and aromatic amines as described herein is not claimed in this application but is made the subject of a divisional application Ser. No. 63223 filed October 10, 1925.

What I claim is:

1. A process for vulcanizing rubber which comprises combining the rubber with a vulcanizing agent and the steam blown reaction product of an aldehyde and an aromatic amine, and vulcanizing the rubber.

2. A process for vulcanizing rubber which comprises combining the rubber with a vulcanizing agent and the steam blown reaction product of acetaldehyde and an aromatic amine, and vulcanizing the rubber.

3. A process for vulcanizing the rubber which comprises combining the rubber with a vulcanizing agent and the steam blow reaction product of acetaldehyde and a primary aromatic amine, and vulcanizing the rubber.

4. A process for vulcanizing rubber which comprises combining the rubber with a vulcanizing agent and the steam blown reaction product of acetaldehyde and aniline, and vulcanizing the rubber.

5. A vulcanized rubber derived from rubber or similar material combined with a vulcanizing agent and the steam blown reaction product of an aldehyde and an aromatic amine, and vulcanized.

6. A vulcanized rubber derived from rubber or similar material combined with a vulcanized agent and the steam blown reaction product of acetaldehyde and an aromatic amine, and vulcanized.

7. A vulcanized rubber derived from rubber or similar material combined with a vulcanizing agent and the steam blown reaction product of acetaldehyde and a primary aromatic amine, and vulcanized.

8. A vulcanized product derived from rubber or similar material combined with a vulcanizing agent and the steam blown reaction product of acetaldehyde and aniline, and vulcanized.

9. A process for vulcanizing rubber which comprises combining the rubber with a vulcanizing agent and the steam blown reaction product made by combining 1.3 moles of acetaldehyde and 1 mole of aniline, and vulcanizing the rubber.

10. A vulcanized product derived from rubber or similar material combined with a vulcanizing agent and the steam blown reaction product made by combining 1.3 moles of acetaldehyde and 1 mole of aniline, and vulcanized.

Signed at Perth Amboy, in the county of Middlesex and State of New Jersey, this 24th day of June A. D. 1925.

ADRIEN CAMBRON.